United States Patent

[11] 3,591,707

[72] Inventor Harold W. Abbott
Syracuse, N.Y.
[21] Appl. No. 789,878
[22] Filed Jan. 8, 1969
[45] Patented July 6, 1971
[73] Assignee General Electric Company

[54] COLOR TELEVISION DEMODULATOR
13 Claims, 4 Drawing Figs.

[52] U.S. Cl. .......... 178/5.4, 329/50
[51] Int. Cl. .......... H04n 9/50
[50] Field of Search .......... 178/5.4 SD, 5.4; 329/50; 328/133

[56] References Cited
UNITED STATES PATENTS

| | | | |
|---|---|---|---|
| 2,884,480 | 4/1959 | Pritchard et al. | 178/5.4 (SD) |
| 3,158,816 | 11/1964 | Harris | 178/5.4 (SD) |
| 3,253,223 | 5/1966 | Kettel | 329/50 |

*Primary Examiner*—Richard Murray
*Assistant Examiner*—Richard P. Lange
*Attorneys*—Richard V. Lang, Marvin A. Goldenberg, Frank L. Neuhauser, Oscar B. Waddell and Melvin M. Goldenberg

ABSTRACT: A color television demodulator is disclosed for processing the NTSC color signal. It abstracts three individual color signals suitable for application to a three-color reproducer from the detected video signal. The demodulator employs a pair of doubly balanced four-quadrant, true product multipliers for synchronously detecting the chrominance signal at two preassigned angles with respect to the color subcarrier. When such demodulators process the NTSC color signal, wherein the color subcarrier is modulated on a carrier whose frequency is selected to produce alternate line and alternate field phase reversals in a synchronously detected signal, the chrominance and luminance components need not be separated at the demodulator inputs since the effects of the unwanted luminance components at the outputs of the demodulators are effectively cancelled. This cancellation effect, while imperfect, greatly reduces the need for filtering before and after demodulation. The detection angles of the demodulators are accurately controlled by suitably coupling the demodulators and local oscillator phase control inputs to taps on a delay line to which the video signal is applied.

INVENTOR:
HAROLD W. ABBOTT,
BY Richard V. Lang
HIS ATTORNEY.

INVENTOR:
HAROLD W. ABBOTT,
BY [signature]
HIS ATTORNEY.

COLOR TELEVISION DEMODULATOR

BACKGROUND OF THE INVENTION

1. Field of the Invention

The invention relates to color television demodulation and more particularly to the derivation of the individual color signals from an NTSC signal in a form suitable for application to a three-color reproducer.

2. Description of the Prior Art

The conventional color television demodulator for the conventional NTSC signal requires a substantial number of tuned circuits and filters to separate the luminance components from the chrominance components at the inputs to the chrominance detectors. After detection, additional filters are ordinarily required to eliminate extraneous terms developed in the detection process. For optimum detection efficiency the detection angles should be fixed. In practice, however, the presence of tuned circuits tends to distort the phase of the color signals as a function of frequency and to narrow the frequency range over which detection is satisfactory. In addition, the traditional techniques for establishing the desired chrominance detection angles have been less than optimum, often depending upon the detuning of a tuned circuit. The latter technique is both impermanent and suffers from the need for adjustment in the first place. Since such demodulation circuits have required a substantial number of inductive and high-valued capacitance components, their conversion to low-cost integrated circuit form have been only partial.

SUMMARY OF THE INVENTION

It is accordingly an object of the present invention to provide an improved color television demodulator for use with the NTSC signal.

It is another object of the present invention to provide a color television demodulator having improved means for establishing the detection angle of the individual color demodulators.

It is a further object of the present invention to provide a color television demodulator wherein inductive components and large capacitances are substantially eliminated.

It is an additional object of the present invention to provide a color television demodulator suitable for execution in integrated circuit form.

It is still another object of the present invention to provide a color television demodulator having reduced filtering requirements and permitting increased bandwidth in the chrominance signal.

These and other objects of the invention are achieved in accordance with the invention by the use of a pair of four-quadrant, double-balanced true product multipliers to which the full detected NTSC video signals are applied for demodulation. The multipliers are arranged to detect at substantially mutually orthogonal detection angles, and their double-balancing connection causes the luminance signal coupled to their inputs to be detected at successively opposed phases as a consequence of line and frame phase alternation, a characteristic of the NTSC signal. This causes effective cancellation of the luminance signal in the chrominance detector outputs. To achieve precision in the detection angle of one demodulator in respect to the other and avoid the need for adjustment, the video signals are applied to a delay line, to which one demodulator is connected at a suitable delay point. To achieve precision in the placement of both detection axes for IQ demodulation, the phase control connection to the local oscillator is also coupled to a suitable tap on the delay line. For B–Y, R–Y demodulation, a phase-inverting connection to one demodulator provides the appropriate detection angles. By use of these demodulation techniques, product terms only appear at the detector outputs, and the filtering requirements for such terms are quite modest. Filters are either eliminated or at most required in only vestigial form. An undersized coupling capacitor coupling the video signal to the video demodulator input, which passes the color subcarrier without attenuation but discriminates against lower frequency luminance information provides quite adequate input filtering for the demodulator. The output filtering need not include LC components, and depending upon demodulator linearity, may be reduced either to an RC network or to a simple shunt capacitor in many practical applications.

BRIEF DESCRIPTION OF THE DRAWING

The novel and distinctive features of the invention are set forth in the claims appended to the present application. The invention itself, however, together with the further objects and advantages thereof may be best understood by reference to the following description and accompanying drawing, in which:

DESCRIPTION OF THE PREFERRED EMBODIMENT

Figure 1:
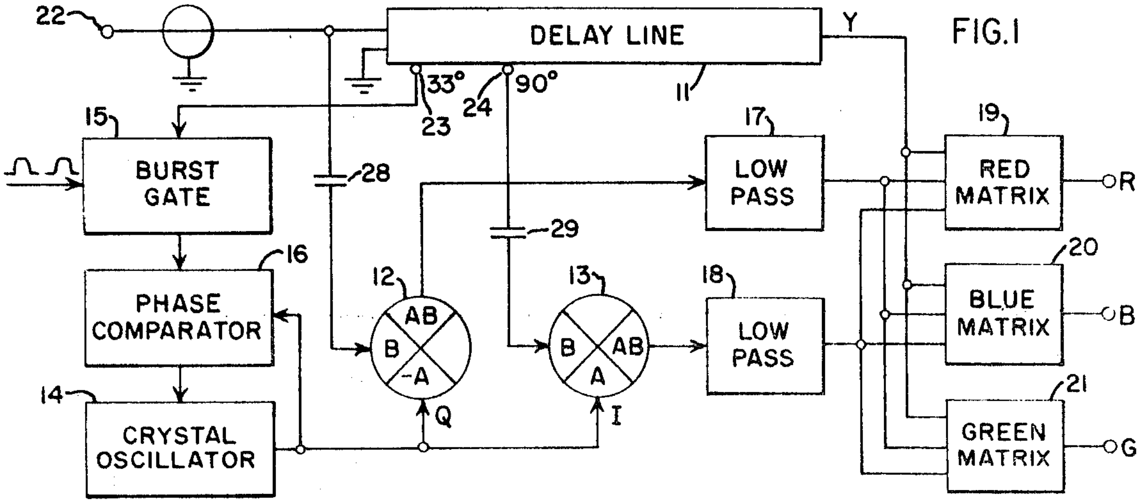
FIG. 1 is a block diagram of a first embodiment of the invention adapted to produce the color signals for operation of a color picture tube through use of "I" and "Q" demodulation.
Figure 3:
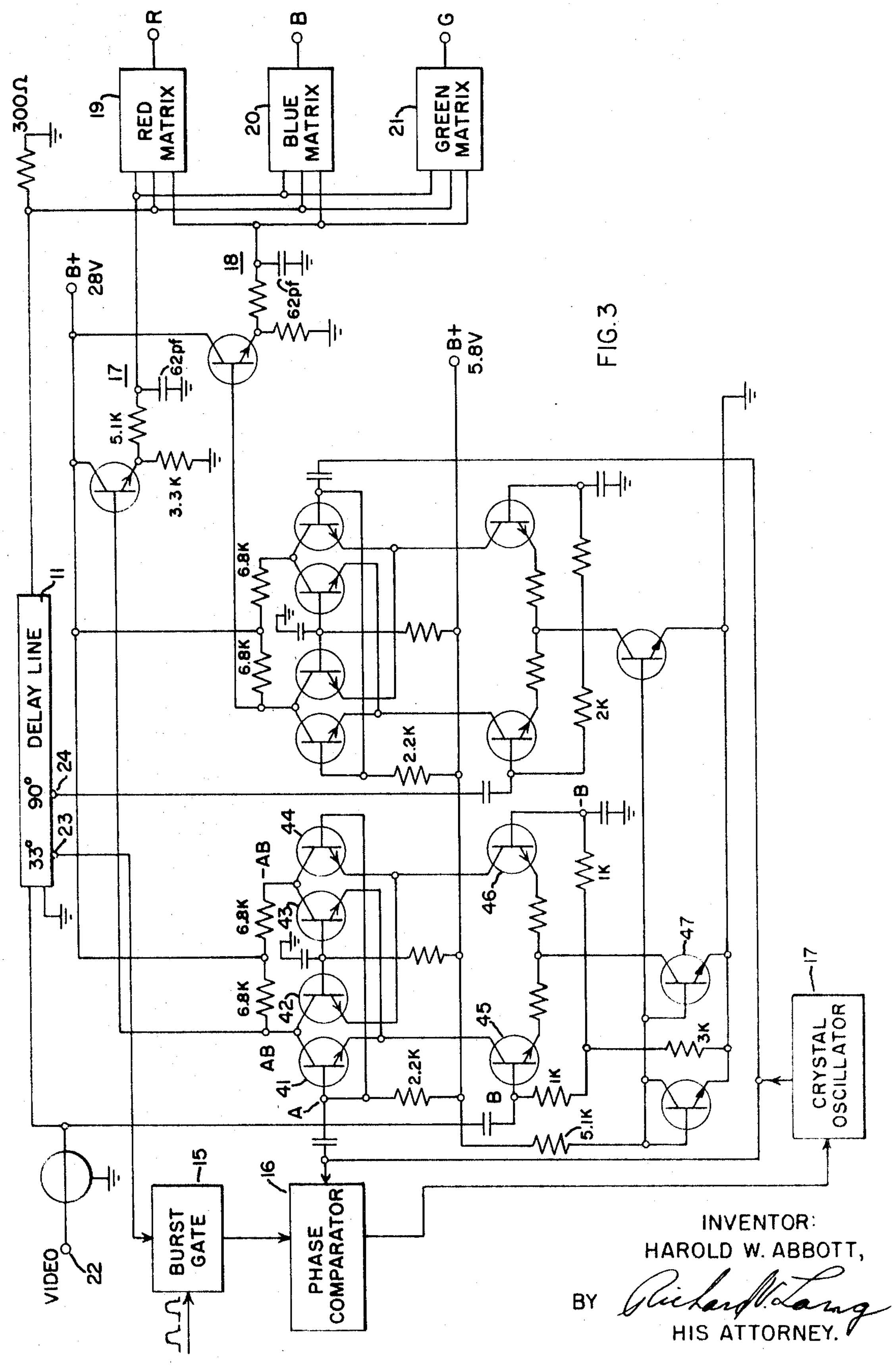
FIG. 3 is a more detailed circuit description of the first embodiment.

The first embodiment of the invention illustrated in FIGS. 1 and 3 has as its principal components a delay line 11 coupled to a source of video signals and having a pair of intermediate taps, a first synchronous demodulator 12 for Q demodulation, a second synchronous demodulator 13 for I demodulation, a crystal oscillator 14 coupled to both demodulators and phase controlled by the applied video signal by means of the connection to a tap on the delay line 11, a burst gate 15 and phase comparator 16. Both demodulators 12 and 13 are true product multipliers, doubly balanced devices operating with high linearity and producing vectorial products in four quadrants. A first low-pass filter 17 is provided to the output of the the Q demodulator for eliminating extraneous higher frequency terms and a similar low-pass filter 18 is provided coupled to the output of the I demodulator for the same purpose. The I and Q signals are mixed with the Y signal in three matrices 19, 20, 21 to obtain the red, blue and green signals. The foregoing elements whose functions have been outlined are arranged to provide the requisite color signals for a television receiver of the conventional type. Using the color signals on the three cathodes of the color cathode-ray tube, the three control grids need not receive video information and may be grounded.

The tapped delay line 11 is coupled to an input terminal 22 from which the full video signal is derived and the output of the delay line is coupled to the matrices 19, 20, 21 which are themselves ultimately connected to the cathode of a color picture tube. In a typical television receiver, the terminal 22 is coupled to the last stage of video amplification. The delay line 11 has a delay time typically of from 0.4 to 0.7 microseconds this delay being selected to bring the Y signal to the desired in time relation to the I and Q signals as they appear at the input of the matrices 19, 20 and 21. The delay in the I, Q processing channels is primarily attributable to the low-pass filters 17 and 18. Accordingly, a reduction in delay in these filters will permit a corresponding reduction in the delay in delay line 11. There may, however, exist in the input signal at 22 different delays between luminance and chrominance components, which may require compensation by the delay line 11 beyond that required for filters 17 and 18.

The two taps on the delay line 11 include a first tap 23 connected at approximately 33° delay (0.026 microseconds) and a second tap 24 connected at 90° delay (approximately 0.07 microseconds). Since the total delay in the delay line is from about 0.4 to 0.7 microseconds, both taps are relatively close to the input of the delay line 11.

The first tap 23 is used to derive the control signal for slaving or controlling the phase of the crystal oscillator 14 at 33° delay from the reference phase of the color burst. The input of the burst gate 15 is connected to tap 23 and its output is coupled to the phase comparator 16. The gating control for the burst gate 15 is coupled to receive a horizontal flyback pulse 25 derived from another portion of the television set. These pulses 25 occur at the horizontal line rate and are timed to be delayed slightly after the actual horizontal pulse so as to open the gate during the few moments that the color burst is being transmitted on the video signal. In the event that suitable flyback pulses are not available at the appropriate time, gating pulses may be readily synthesized from the horizontal pulses.

Once open, the burst gate 15 supplies the burst (a short pulse at the color subcarrier frequency) to one input of the phase comparator 16. The phase comparator 16 has another input coupled to the output of the crystal oscillator 14 and it is adapted to produce a DC voltage indicative of the phase disparity between the two signals applied to its input. The crystal oscillator may be of a type subject to control by a DC voltage applied to a voltage-sensitive capacitor in the oscillator circuit. Since the initial accuracy of the crystal oscillator may be within 100 cycles of the desired color subcarrier frequency, the range of adjustment provided by a voltage-sensitive capacitor (typically ±300 cycles) is quite adequate to keep the crystal oscillator both on frequency and in phase with the color burst. The foregoing elements 14, 15 and 16 are well known in themselves and may employ other phase control configurations, such as injection locking. The output of the crystal oscillator 14 is then fed to the demodulators 12 and 13.

The demodulator 12 which is used for Q demodulation has one input (B) capacitively is coupled by capacitor 28 to the video input terminal 22 and the other input (A) coupled to the output of the crystal oscillator 14. The capacitor 28 should be selected as a high pass filter to pass the chrominance information, while not passing the low frequency luminance information. As will be described in greater detail below, the demodulator 12 is a four-quadrant, true-product multiplier performing synchronous demodulation. When in the form illustrated in FIG. 3, it may be reconnected as needed to invert the polarity of the output signal. Since the crystal oscillator 14 produces a signal at color subcarrier frequency delayed 33°, the output of the demodulator 12 will accordingly lie along an axis delayed 33°. Referring to the color phasor diagram of FIG. 2, it will be seen that this will produce an output along the Q axis of Q polarity. Ordinarily it is preferable that the Q signal be of +Q polarity (+AB) and this is achieved by an internal phase-inverting connection to the demodulator.

After synchronous demodulation, an output signal is produced which recovers the original Q modulation from DC to the full bandwidth of the Q signal (corresponding to about 0.6 megacycles). This signal is then coupled from the output of the multiplier 12 to low-pass filter 17 which eliminates any higher frequency terms and supplies the Q signal to the output matrices 19, 20 and 21.

Figure 2:
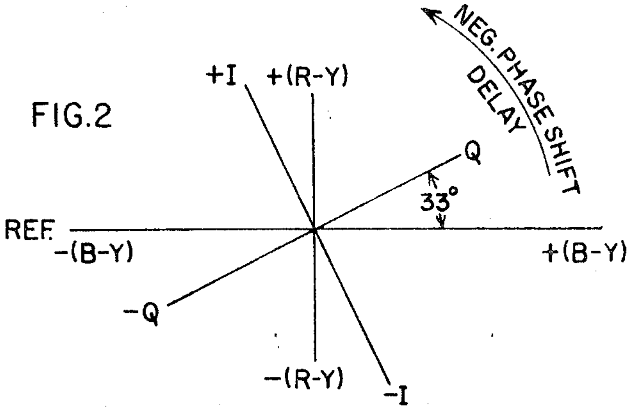
FIG. 2 is a color phasor diagram.

The demodulator 13, which is used for I demodulation, has one input (B) capacitively coupled by capacitor 29 to the tap 24 on the delay line 11 (which corresponds to 90° delay) and another input terminal (A) connected to the output of the crystal oscillator 14. The capacitor 29 should be selected as a high pass filter to pass the chrominance information, while not passing the low frequency luminance information. These connections produce detection along the I axis and of −I polarity, as illustrated in FIG. 2. Since positive output polarity is ordinarily desired, the demodulator is coupled to obtain the +I output (+AB). The output from the demodulator 13 is then coupled to low-pass filter 18 which eliminates all higher order terms from the I channel and couples it to another input terminal to the output matrices 19, 20 and 21.

Classically, the low-pass filter 17 has an upper frequency limit of 0.6 megacycles and the low-pass filter 18 has an upper frequency limit of 1.2 megacycles. Television set manufacturers have rarely adhered to these standards, and have ordinarily kept both I and Q channels at equal bandwidths, usually close to 0.5 megacycles. In the present application, wider bandwidths are permissible in the I channel because of the additional delay incurred in the delay line by the placement of tap 24 which may be used to delay the I input signal relative to the Q input signal and thus compensate for an increased relative delay attributable to the greater delay in filter 17 than in filter 18. The tap 24 may be set at 90°, 270°, or generally ($\pi/2+\pi$) where "$n$" is an integer.

A practical circuit of the arrangement illustrated in block diagram form in FIG. 1 is illustrated in FIG. 3. Typical circuit configurations and circuit values are shown for the four-quadrant synchronous demodulators 12 and 13 and their immediate circuitry, particularly low-pass filters 17 and 18. Of interest are the demodulators 12 and 13 themselves.

The demodulator 12 (which is like the demodulator 13) comprises four transistors 41, 42, 43, 44, coupled into two difference amplifier pairs and a third pair of transistors 45, 46, also coupled in a modified difference amplifier configuration with their collectors coupled respectively to the paired emitters of the first and second difference amplifiers. The transistors 41 and 43 whose emitters are coupled together may be regarded as the firs difference amplifier and the transistors 42 and 44 as the second difference amplifier. The first signal (A) input connection of positive reference phase may be made to the bases of the transistors 41 and 44 (which are tied together) and of negative reference phase (−A) to the common connection of the bases of transistors 42 and 43. While both "A" and "−A" input connections may be used simultaneously if the input signal is balanced, one may use either input "A" or "−A" for a single ended signal, it being customary to provide a signal ground to the unused terminal. Normal phase output products (AB) may be derived from the collectors of the transistors 41 and 42 (which are tied together), whereas inverse phase products (−AB) may be obtained from the collectors of the transistors 43 and 44. The third transistor pair has its emitters coupled through like individual resistances to a constant-current source provided by the transistor 47. The collector of the transistor 45 is coupled to the emitters of the first difference amplifier (41, 43) and the collector of the transistor 46 is coupled to the emitters of the second difference amplifier (42, 44). The second signal (B) input connection of positive reference phase may be made to the base of the transistor 45 and of opposite phase (−B) to the base of transistor 46. Here also, if single-ended operation is used, one will provide a signal ground to the unused terminal.

The demodulators 12 and 13 are four-quadrant, true product multipliers producing a simple product (AB) from two input wave quantities A and B. They may be connected to invert the polarity of input quantity A, input quantity B, or the output quantity (AB). In demodulation, by "multiplying" an amplitude modulated signal by its carrier or a reconstructed carrier of suitable phase, one recovers the amplitude modulation.

The operation of the demodulators 12 and 13 may be explained as follows. A difference amplifier, for instance transistors 41, 43, by virtue of their common emitter configuration, functions so that a signal applied to the base of transistor 41 which increases the emitter current in transistor 41, tends to cause a decrease in emitter current in transistor 43. If the total emitter current is stabilized, as by the provision of a constant-current source in their common emitter circuit, increases in emitter current in one transistor will become precisely equal to decreases in the emitter current of the other paired transistor. If the alpha of the transistors are close to unity, equal and offsetting changed in collector current will also occur.

Assuming that a signal (A) of appropriate polarity is applied at the base of the transistors 41 and 44, the transistor 41 and 44 will together increase in current while transistors 42 and 43 correspondingly decrease in current. If one measures the current at either output point, however, one will find no net current change. If, however, a signal (B) is applied to the third transistor pair, such that transistor 45 is now made more conductive than the transistor 46, then one will observe that the difference amplifier comprising transistors 41 and 43 is now operating at a higher current level than the difference amplifier comprising the transistors 42 and 44. At the collector load resistance coupled to 41, 42, it will be seen that the output current is affected by both the "A" input quantity and the "B" input quantity and will contain the AB product or modulation term.

It has been pointed out that in a difference amplifier $$i_c=\frac{\alpha I}{2}\left\{1+\frac{1}{2}\left(\frac{vq}{kt}\right)-\frac{1}{24}\left(\frac{vq}{kt}\right)^3+\frac{1}{240}\left(\frac{vq}{kt}\right)^5\right\} \quad (1)$$

where $i_c$ = collector current
$\alpha$= collector to emitter current
$I$ = the current fed to the emitters
$v$ = the difference in the base voltages
$q$ = electronic charge
$k$ = Boltzman's constant
$t$ = junction temperature When $v$ is made small, the cubic and higher order terms may be neglected:

$$i_c=\frac{\alpha I}{2}\left\{1+\frac{1}{2}\left(\frac{vq}{kt}\right)\right\} \quad (2)$$

The second term of expression 2 has a component ($Iv$) from which the product term, i.e., the original modulation is obtained. Assuming that the B input linearly controls the current ($I$) fed to the emitters of a difference amplifier and that the A input linearly controls the interbase potential ($v$), one may conclude that the collector current ($i_c$) should contain a product term (AB) corresponding to the ($Iv$) term in expression 2.

When the difference amplifiers 41, 43, and 42, 44, are paired and driven by a third difference amplifier comprising transistors 45, 46, the modulator is said to be doubly balanced. The output of the doubly balanced modulator may be determined from an inspection of expression 2 which represents the output of a single difference amplifier. An increase in the initial current term ($\alpha I/2$) will ordinarily appear in the output of one of the transistors (transistor 41) when its emitter current is increased. However, any increase in current at the collector of transistor 41 is matched by an equivalent decrease in current in the collector of transistor 42 due to the double balancing action of transistors 45, 46. Thus changes in the initial current terms are cancelled and they may be treated as constant terms. By suitably poling the input signal connections to the bases of both transistor pairs the second term of the expression 2 may be left uncancelled to provide the desired product term.

A device employing three pairs of difference amplifiers has been analyzed, particularly with respect to errors and inaccuracy, in an article appearing in THE JOURNAL OF SCIENTIFIC INSTRUMENTS, 1966, volume 43, pages 165, etc., by R. R. A. Morton, entitled "A Simple DC to 10 Mc/s Analog Multiplier." In practice, the linearity of the demodulator is improved when transistors having low base resistances are employed, having alphas close to unity (betas being high) and if they are operated in frequency ranges well below their alpha cutoffs.

In the illustrated arrangement, it is preferable for the color subcarrier to be fed to the A terminals of the demodulators at a relatively high amplitude. This adjustment makes the system function as if the A input signal were a succession of rectangular pulses having a period and duration equal to half-cycles of the color subcarrier. Such an adjustment has the effect of switching the transistors between on and off states, thus making the demodulated output independent of any variability in the amplitude of the crystal oscillator and also further suppressing even-order intermodulation products at the expense of odd-order products, which are at more remote high frequencies.

The output of the product demodulator 12, as illustrated in FIG. 3, is coupled to an emitter follower output connection and fed through the low-pass filter 17 to the output matrices 19, 20, 21. The low-pass filter 17 may take a number of variant forms including the use of both inductive and capacitive elements. However, in the interests of circuit simplicity, quite adequate filtering can usually be obtained by a simple RC network. In certain applications the filtering can approach the vestigial form of a single shunting capacitor selected to reduce the signal passed at frequencies above 0.5 megacycles (or the selected cutoff frequency). Similarly, the output of the demodulator 13 is fed to an output emitter follower as shown in FIG. 3, and subsequently through the other low-pass filter 18 to the matrices 19, 20 and 21. The low-pass filter 18 may take the same forms as the low-pass filter 17 including the vestigial form in which only a shunt capacitor is provided. The cutoff frequency of the low-pass filter in the I channel may be at 1.2 megacycles, although in practice it is ordinarily set at about the same narrow band as the Q channel.

The demodulators 12 and 13 are essentially free of spurious signals of their own creation below double the subcarrier frequency (approximately 7.2 megacycles). There may remain, however, sundry components from various other sources that may adversely affect the output signal if filtering is not employed. Accordingly, depending upon the absence of these other components, the cutoff frequency of the filters 17 and 18 may exceed the conventional 0.5 megacycles without adverse effect.

As the cutoff frequency of the low-pass filters 17 and 18 is increased, their delay of the applied signal decreases permitting the delay line 11, whose purpose is to bring the Y signal into proper timed relation with the I and Q channels to be shortened. Shortening from an initial value of 0.7 microseconds to about 0.4 is typical. In the event that no earlier relative delays have occurred between luminous and chrominance components and that vestigial low-pass filtering is permissible, the delay line may be shortened to the point where it is a little longer than that required for the taps 23 and 24, which are provided for controlling the crystal oscillator and for deriving the I signal from the delay line.

In using balanced true product multipliers for synchronous demodulation of the chrominance signal, considerable simplification in filtering is achieved. Since the chrominance signal is modulated upon the color subcarrier at 3.5 megacycles, synchronous detection by product multiplication recovers the original modulation over a band from essentially DC to 0.6 megacycles for the Q channel and over a band extending to 1.2 megacycles for the I channel. Spurious terms resulting from the process of demodulation of the chrominance signal are negligible in the vicinity of 3.5 megacycles and first occur in the vicinity of 7.2 megacycles but at greatly reduced levels. In addition, linearity of the transistors 45 and 46 to which the luminance and chrominance components are both applied prevents the appearance of intermodulation terms from their joint presence. Ordinarily the transistors 45 and 46 are selected to have reduced base resistances, high alphas, as previously indicated, and one may add a degenerative resistor into the emitter lead of each. These measures eliminate intermodulation terms from their output.

Finally, the demodulators 12 and 13 do translate the luminance components that appear in their input to their output, but visual effect of these terms is negligible due to cancellation. Thus a luminance component a near DC is translated to 3.5 megacycles and a luminance component at 2.0 megacycles is translated to 1.5 megacycles. However, due to the four-quadrant action of the multiplier and frequency interlace, the luminance terms appear in one line of one polarity and in the adjacent line of opposite polarity. In addition, the same information is inverted between successive frames. This effect, which is due to the selection of the color subcarrier at an odd multiple of one-half the line rate and at an odd multiple of one-half the frame frequency, produces almost complete visual cancellation of any luminance components in the output of the chrominance demodulators.

In practice, there may be a small reduction in the gray scale of the picture. The joint effect of the two extraneous luminance components is neutral in a color sense, since the detection angles of successive lines are opposed 180°, but together they do add slightly to the brightness level. The amount of information transmitted in the luminance signal falls off relatively rapidly as the translated terms approach the useful spectrum of the I and Q channels and so the effect is small. This nonimpairment in the color signal by the white signal components is the converse of the effect that exists when an ordinary detector in a black and white receiver detects the "compatible" chrominance signal.

Because of this converse "compatibility," four-quadrant multiplier detection does not require that the luminance components be filtered out from the inputs of the chrominance detectors. Thus while some filtering action may be conveniently achieved by coupling the demodulators 12 and 13 to the video sources through coupling the demodulators 12 and 13 to the video sources through coupling capacitors selected to discriminate against the lower frequency luminance terms, even this degree of filtering is not usually necessary. By use of this mode of detection, the sharply tuned band-pass filters customarily required prior to chrominance detection are unnecessary. One may regard these band-pass filters as having been replaced by the relatively simple low-pass RC filters or shunt capacitors placed at the outputs of the demodulators and by the optional undersized coupling capacitor.

In order to obtain the R, B and G color signals, the R matrix 19, B matrix 20 and G matrix 21 are provided, each coupled to receive the I, Q and Y signals. These matrices are of straightforward design and need only consist of a collection of resistances and phase-inverting elements (usually in the G matrix). Their design is well known and need not be dwelt upon here.

Figure 4:
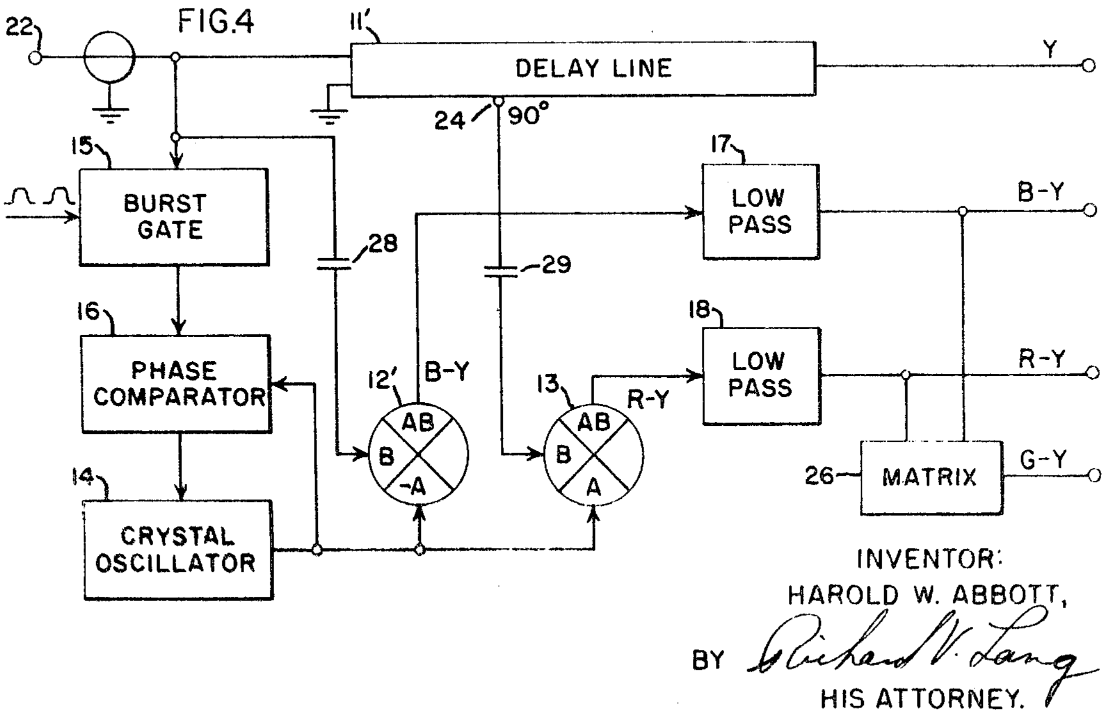
FIG. 4 is a block diagram of a second embodiment of the invention directly producing the R–Y and B–Y color difference signals through "R–Y and B–Y" demodulation and then obtaining the G–Y color difference signal by matrixing the first two color difference signals together.

A second embodiment of the invention is illustrated in FIG. 4 comprising essentially the same elements as in the first embodiment. It derives a luminance signal for application to the cathodes of the color picture tubes and color difference signals for application to the individual grids. In this configuration the demodulators 12' and 13 are set to demodulate along the R–Y and B–Y axes and after these two color difference signals are obtained, the third (G–Y) color difference signal is obtained from matrixing of the other two signals. Accordingly, the embodiment in FIG. 4 (where corresponding elements have been given similar numbers, the numbers being primed in the event of modification) comprises a delay line 11' having a single tap 24 at 90° delay. The elements 14, 15 and 16 are as before, but are now coupled to control the crystal oscillator 14 in the phase of the color burst at the input to the delay line 11. The oscillator 14 thus provides the subcarrier to both demodulators 12' and 13 phased along the (B–Y) axis. The B–Y demodulator 12 is suitably connected for phase inversion so as to produce at its output a B–Y signal of suitable polarity (usually positive AB). Reference to the phasor diagram of FIG. 2 shows the requisite detection angle.

The R–Y demodulator 13 is coupled to the 90° tap 24 on the delay line for receipt of the luminance signals as before and its A input is coupled to the crystal oscillator 14 which provides the color subcarrier at reference phase (along B–Y axis). Since the luminance signal is at quadrature, the detection angle of the demodulator falls along the R–Y axis. Ordinarily the output is derived by suitable demodulator connection so as to provide a positive polarity R–Y term.

The low-pass filters 17 and 18 coupled respectively to the outputs of the demodulators 12 and 13 may take the same general form as the filters in the prior embodiment but are normally of equal bandwidths. One may, as previously discussed raise these bandwidths slightly above the customary 0.5—0.6 megacycles with some improvement in signal content. The effect of raising the cutoff frequencies in the low-pass filters 17 and 18 is to make it possible to shorten the amount of delay in the delay line 11' allocated to these filters.

The invention has been described in two particular embodiments employing detection angles suitable for I and Q or for B–Y and R–Y detection. In practice, depending upon the hue and brightness of the phosphors which are used in the color picture tube, most television set manufacturers employ angles which depart from these classical detection angles. Thus, not only are the I and Q axes shifted by 5° to 15° in practice, but the orthogonality of the I and Q axes may also vary by an equal amount. One can accommodate any particular detection angle that is desired by making suitable connection to the taps on the delay line. After detection, one can further adjust the relative proportions of the individual color signals in the output matrices.

While the invention has been described in connection with a single variety of four-quadrant, true-product multipliers for detection, it should be evident that other devices having this property may also be employed. In practice, the use of three-electrode devices, such as the transistors illustrated in FIG. 3, provide a greater degree of linearity over a large signal range than known two-electrode devices, such as diodes or hall effect devices and these are ordinarily to be preferred. While in the illustrated true product multipliers the carrier was connected to the "A" input and the chrominance components were connected to the "B" input, these input connections may be interchanged. Since the difference amplifiers to which the chrominance components are supplied should have a high degree of linearity, suitable linearizing measures should be used in the selection and operation of these transistors to which those components are applied. The "double-balancing" or four-quadrant action in the product multiplier is of course essential to the removal of the adverse visual effects of the luminance signal in the chrominance output and the other linearizing effects are relatively less consequential.

The invention may be fabricated in any of several well-known forms including discrete component assembly and a large variety of integrated circuit assembly. In simplifying the filtering requirements of the circuit, most inductive components and large capacitances can usually be eliminated. If active elements such as silicon transistors are employed, the color decoder can be readily fabricated in monolithic silicon materials. In selecting active components, interest in vacuum tube devices is presently declining but they may be used in the four-quadrant multipliers and in other portions of the circuit in accord with established practice. Devices of increasing interest, however, are semiconductor devices whose preferred form are three electrode junction devices, achieving linear operation under signal control. They are generally called "-junction transistors." There is also a growing family of suitable three-electrode linear devices, some of which do not have junctions, but most of which are solid-state devices. Most prominent of these newer devices are the field effect transistors and metal oxide film devices. While the invention is probably best expressed in terms of circuitry, and in particular its simplicity in separately abstracting the individual color components, the major advantage of the invention is in the ease with which simple and inexpensive circuit components can be made to perform this complex task.

Although the invention has been described with reference to specified practical embodiments, it will be appreciated that various modifications may be made by those skilled in the art without departing from the spirit and scope of the invention.

What I claim as new and desired to be secured by Letters Patent in the United States:

1. A color television demodulator for a color signal compatible with black and white reception comprising:

a. a source of detected video signals including a luminance signal; a chrominance signal modulated in quadrature on the color subcarrier; and a color burst signal at a frequency selected to produce alternate line and alternate field phase reversals in a synchronously detected signal;

b. wave-generating means for locally generating a wave at the frequency of and in predetermined phase relationship to said color burst;

c. a first four-quadrant multiplier coupled to said source and to said wave-generating means for synchronously demodulating said chrominance signal at a preassigned angle by multiplication and for effectively cancelling luminance components from the output thereof by multiplying them by said wave to produce product terms of successively opposite phase;

d. a second four-quadrant multiplier coupled to said source and to said wave-generating means for synchronously demodulating said chrominance signal at a second preassigned angle, substantially orthogonal to said first angle, by multiplication and for effectively cancelling luminance components from the output thereof by multiplying them by said wave to produce product terms of successively opposite phase; and e. means coupled to said source and to the outputs of said first and second multiplier demodulators for matrixing the signals therefrom to obtain three color signals for reproduction.

2. A color television demodulator as set forth in claim 1 having in addition thereto a tapped delay line having an input terminal coupled to said source, and means for coupling one of said demodulators to a tap on said delay line spaced to achieve substantial orthogonality in the detection angle of one demodulator relative to the other demodulator.

3. A color television demodulator as set forth in claim 2 wherein a second tap is provided on said delay line and coupled to said wave-generating means to delay the phase of the generated wave and thereby shift the detection angles of both demodulators.

4. A color television demodulator as set forth in claim 3 wherein the demodulator coupled to said tap is arranged for "I" demodulation, whereas the other demodulator is arranged for "Q" demodulation.

5. A color television demodulator as set forth in claim 4 wherein the output terminal of said delay line is coupled to said matrixing means;

wherein low-pass filters are provided at the outputs of said demodulators for passing useful chrominance information and rejecting higher frequency components; and wherein the amount of delay in said delay line is adjusted to bring said luminance information and said demodulated chrominance information into substantial time coincidence.

6. A color television demodulator as set forth in claim 5 wherein the low-pass filter coupled to said I demodulator is set at a higher cutoff frequency than the low-pass filter coupled to said Q demodulator; and wherein said tap on said delay line coupled to said I demodulator is spaced to offset the difference in time delay between said I and Q signals attributable to said low-pass filters so as to restore substantial time coincidence between said filtered signals.

7. A color television demodulator as set forth in claim 6 wherein the coupling of said video signals to said demodulators is capacitive, the capacitances thereof having values selected to couple signals at subcarrier frequency without substantial reduction in amplitude while substantially reducing the amplitude of lower frequency terms of said luminance signal.

8. A color television demodulator as set forth in claim 2 wherein the demodulator coupled to said tap is arranged for R–Y demodulation, and said other demodulator is arranged for B–Y demodulation.

9. A color television demodulator as set forth in claim 8 wherein B–Y demodulation is achieved by a phase-inverting connection of said locally generated wave to said other demodulator.

10. A color television demodulator as set forth in claim 9 wherein the output terminal of said delay line is coupled to said matrixing means;

wherein low-pass filters are provided at the outputs of said demodulators for passing useful chrominance information and rejecting higher frequency components; and wherein the amount of delay in said delay line is adjusted to bring said luminance information and said demodulated chrominance information into substantial time coincidence.

11. A color television demodulator as set forth in claim 1 wherein said four quadrant multiplier comprises three transistor difference amplifiers, said wave and said video signal being the applied quantities;

a pair of said difference amplifiers sharing a pair of equal-valued collector loads in which a term representing the product of said two applied quantities is developed, the emitters of the transistors in each difference amplifier being joined;

means for coupling a first quantity between the bases of the transistors in said paired difference amplifiers in a polarity for production of said product term when the second quantity causes opposing changes in said joint emitter currents; and said third difference amplifier having its transistor collectors connected respectively for control of said joint emitter currents, said second quantity being coupled across the transistor bases of said third difference amplifier to achieve equal and opposite changes in said joint emitter currents and thereby achieve four-quadrant multiplication.

12. A color television demodulator as set forth in claim 11 wherein said locally generated wave is coupled to the bases of said pair of difference amplifiers and said video signals are coupled to the bases of the transistors in said third difference amplifier.

13. A color television demodulator as set forth in claim 12 wherein said locally generated wave is coupled to said paired difference amplifiers at a relatively high amplitude to achieve switchlike operation; and wherein said video signals are applied to the bases of said third difference amplifier at a level permitting linear operation of said third difference amplifier.